UNITED STATES PATENT OFFICE

2,272,397

METHOD OF MAKING RUBBER COMPOUNDS OR PRODUCTS

Harold Becher, Albert S. Keston, and Jacob Stein, New York, N. Y., assignors, by direct and mesne assignments, to Antiseptics, Inc., New York, N. Y., a corporation of New York No Drawing. Application December 21, 1935, Serial No. 55,680

1 Claim. (Cl. 260—768)

Our invention relates to a new and improved method of making rubber compounds or products, and to new and improved rubber compounds or products.

While we prefer to use our improved method for making said novel compounds or products, the claims for said compounds or products are not to be limited to any particular method of making the same.

One of the objects of our invention is to produce rubber compounds or products which are intimately combined with certain antiseptic materials, preferably by an adsorption action.

Another object of our invention is to provide a method which can be carried out cheaply and which is suitable for large scale production, and which can be applied to vulcanized rubber and also to unvulcanized rubber.

Another object of our invention is to make rubber which is suitable for making sanitary garments, such as infants' garments, wearing apparel in general, bed-sheets, hot water bags, rubber mats, rubber tiles, toilet seats, surgical goods, adhesive tape, and other articles which are brought in contact with the human body or which require antiseptic properties.

Rubber articles of this type may be either thin or thick. They will retain their antiseptic properties, even if washed repeatedly under ordinary conditions.

As an example of the antiseptic material which we prefer to employ, we refer to oxyquinoline.

Under suitable conditions, unvulcanized rubber may be masticated or mixed directly with said antiseptic, while the oxyquinoline is in dry and solid form. During said milling or mixing, the mechanical operations raise the temperature of the batch of unvulcanized rubber to about 200° F. At said temperature the oxyquinoline is vaporized, and its vapors permeate the unvulcanized rubber. This operation is preferably carried out in a closed room or chamber, so that there is little or no escape of the vapor of the oxyquinoline.

Tests have shown that the oxyquinoline is very uniformly dispersed throughout the rubber, and that the rubber adsorbs the oxyquinoline, so as to secure a very firm combination.

Likewise we can treat vulcanized rubber, which may be in sheet form, with the vapor of oxyquinoline. Said sheets of rubber may have a thickness of from .004 of an inch to .030 of an inch. Thin sheets of vulcanized sheets of rubber can be thus treated with the vapor of oxyquinoline, at a temperature from 120° F. or 160° F. The sheets of vulcanized rubber are maintained at about this temperature, in order to prevent the vapor from the oxyquinoline from condensing on the surface of the rubber. The oxyquinoline vapor permeates or passes through the thin rubber sheet, so that the entire rubber sheet takes up the oxyquinoline, instead of having this effect confined to the surface of the thin sheet.

We have discovered that sheet rubber is quite permeable to the vapor of oxyquinoline, and that said vapor can pass through several sheets of thin and vulcanized rubber.

Tests have shown that the rubber can be increased in weight, by causing it to adsorb the oxyquinoline vapor, from .001 percent to ½ percent.

If unvulcanized rubber is caused to take up oxyquinoline, by the method previously stated, we prefer to vulcanize said rubber at a relatively low temperature, about 110° F., by treating the rubber with sulphur monochloride. We do not wish to be limited to any particular method of vulcanization, because vulcanization may be accomplished by means of heat and pressure if sufficient accelerator is used, so that the rubber is vulcanized without driving off the oxyquinoline which has been adsorbed by the unvulcanized rubber.

Likewise, we prefer to treat vulcanized sheet rubber with a vapor of oxyquinoline, after said vulcanized sheet rubber has been vulcanized at a relatively low temperature with sulphur monochloride. However we do not wish to be limited to the treatment of any particular kind of vulcanized rubber.

We prefer to treat the rubber with the vapor of oxyquinoline, after the rubber has been vulcanized, because this treatment does not change the color of the rubber, and this method is suitable for large scale production.

Likewise garments or other articles which have been wholly or partially manufactured, can be treated with the vapor of oxyquinoline.

Tests have shown that the rubber which has thus adsorbed the oxyquinoline will retain said antiseptic, even if the rubber is treated with boiling water and with weak solutions of alkalis. Likewise the rubber will resist the complete removal of the oxyquinoline, if the rubber is treated with acid. The rubber also retains its antiseptic properties, even after prolonged washing.

Tests have shown that rubber which has been thus treated will inhibit the growth of *Staphylococcus aureus*, or other organisms.

The invention is therefore particularly valuable in the manufacture of rubber baby pants, since the antiseptic rubber will diminish the danger of skin rashes and the like.

Whenever we refer to oxyquinoline, we also wish to include the derivatives thereof.

As one illustration of such derivatives, we may utilize 6-ethyl-8-oxyquinoline.

Whenever we refer to the treatment of rubber, we wish to include a substantially pure rubber, and we also wish to include the treatment of rubber sheeting or other rubber material which has been compounded with suitable ingredients.

Likewise the rubber may be compounded with an alkali or with an alkaline earth salt such as calcium corbonate or magnesium carbonate. Such substances may comprise from ½ per cent to ten per cent of the weight of the rubber.

Tests have shown that after a sheet of rubber has been thus treated, the surface of the rubber can be removed by scraping or the like, and the rubber still retains its antiseptic properties.

Hence the rubber becomes antiseptic for a substantial thickness.

In addition to treatment with a vapor of oxyquinoline or of derivatives thereof, we can also use the vapors of the following substances:

p-chlor-m-xylenol, cresophan, thymol, pyrogallol, the cresols, salicylamide, chlor-thymol, hexylresorcinol and the alkylated resorcinols, and the like compounds. The vapors of said substances are either adsorbed by the rubber at the surface of the rubber, or said vapors penetrate through the rubber.

Rubber which has been treated as stated herein, has surface antiseptic properties, when the rubber is placed in contact with the skin. The skin emits a watery secretion, which takes up the antiseptic material from the rubber. The adsorbed antiseptic which is below the outer surface of the rubber diffuses or passes through the rubber to the surface of the rubber, as the surface portion of the antiseptic is taken up by the extremely thin film of moisture which is secreted by the skin. The antiseptics above mentioned have a sufficient partition coefficient in favor of water, and said antiseptics have a sufficiently high phenol value so that enough antiseptic can be taken up by the water of the secretion, to provide an effective surface antiseptic action.

It is preferable to treat vulcanized rubber with the antiseptic material in vapor form, because the antiseptic material is not decomposed, either in whole or in part, by the process of vulcanization. Likewise, by using pure rubber or rubber compounds having suitable constituents, the antiseptic is not decomposed, either in whole or in part, when it is taken up by the rubber, so as to yield objectionable by-products. For example, when unvulcanized rubber is caused to take up oxyquinoline, a large part of the oxyquinoline is frequently decomposed during the vulcanization, thus producing an objectionable powder and diminishing the effectiveness of the treatment and making the total antiseptic effect of the rubber uncertain.

Said substances including oxyquinoline, are in the non-vapor form at ordinary body temperature and the adsorbed substances in non-vapor form are sufficiently antiseptic and sufficiently releasable from the rubber at normal body temperature to secure a surface antiseptic effect when the rubber is caused to contact with living human tissue.

When said vapors penetrate through the rubber, the rubber takes up the vapors by absorption, as distinguished from adsorption. Hence absorption and adsorption are equivalent for the purposes of the invention.

We have shown a preferred embodiment of our invention but it is clear that numerous changes and omissions can be made without departing from its spirit.

For example whenever we refer to rubber, we wish to include substances similar to rubber and rubber substitutes, including synthetic rubber.

We claim:

Antiseptic rubber containing the absorbed and condensed vapor of oxyquinoline, said condensed vapor being in the rubber in sufficient proportion and being sufficiently rapidly releasable from the rubber at ordinary body temperature to produce a surface antiseptic and non-toxic effect when the antiseptic rubber contacts with body emissions.

HAROLD BECHER.
ALBERT S. KESTON.
JACOB STEIN.